United States Patent [19]
Freed et al.

[11] 3,856,790
[45] Dec. 24, 1974

[54] CYCLIC AMIDES OF 1,4-DIAMINOBUT-2-YNE

[75] Inventors: Meier E. Freed, Philadelphia, Pa.; John L. Archibald, Windsor, England

[73] Assignee: American Home Products Corporation, New York, N.Y.

[22] Filed: Sept. 18, 1972

[21] Appl. No.: 291,692

Related U.S. Application Data

[63] Continuation of Ser. No. 1,021, Jan. 6, 1970, abandoned, which is a continuation-in-part of Ser. No. 599,408, Dec. 16, 1966, abandoned.

[52] U.S. Cl.. 260/247.2 A, 260/268 H, 260/293.71, 260/293.76, 260/293.86, 260/326.5 SM, 260/326.5 FL, 424/267, 424/274, 424/248
[51] Int. Cl............................................ C07d 87/42
[58] Field of Search...260/247.2 A, 293.71, 326.5 FL

[56] References Cited
UNITED STATES PATENTS
| | | | |
|---|---|---|---|
| 3,301,784 | 1/1967 | Anderson................... | 260/326.5 FL |
| 3,446,797 | 5/1969 | Focella et al. ................ | 260/293.86 |

OTHER PUBLICATIONS
Chemical Abstracts, Vol. 63: 5500C, 1965.
Chemical Abstracts, Vol. 50: 16786e, 1955.

*Primary Examiner*—Lorraine A. Weinberger
*Assistant Examiner*—Paul J. Killos
*Attorney, Agent, or Firm*—Andrew Kafko

[57] ABSTRACT

The compounds are 1,4-diaminobut-2-yne derivatives of pyrrolidinone which are useful as central nervous system depressants.

4 Claims, No Drawings

CYCLIC AMIDES OF 1,4-DIAMINOBUT-2-YNE

This is a continuation of application Ser. No. 1,021, filed Jan. 6, 1970, now abandoned which is a continuation-in-part of application Ser. No. 599,408 filed Dec. 16, 1966 and since abandoned.

This invention relates to chemical compounds that are derivatives of 1,4-diaminobut-2-yne and, more particularly, to certain cyclic amides thereof, and to methods for preparing the latter.

The compounds of the invention may be represented by the general formula:

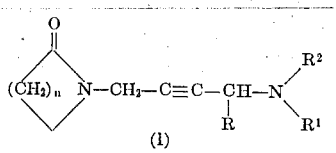

wherein $n$ is an integer from 2 to 3; R is of the group consisting of hydrogen, lower alkyl and phenyl; $R^1$ and $R^2$, when separate, are each of the group consisting of lower alkyl and phenyl(lower)-alkyl, and when joined, complete a ring of the group consisting of (lower)alkyl-pyrrolidino, hydroxy(lower)alkylpyrrolidino, thiopyr-rolidino, piperidino, (lower) alkypiperidino, (lower)alkylpiperazino, di(lower)alkylpiperazino, and morpho-lino, with the proviso that, (lower)alkyl, whenever referred to hereinbefore, consists of from 1 to 4 carbon atoms.

It has been discovered that compounds meeting the described qualifications demonstrate a useful pharmacological activity. Thus, the compounds of this invention have been found to be useful for their pharmacological activity as central nervous system depressants.

The compounds of this invention may be obtained in a variety of ways, as will appear to those skilled in the art. A most convenient method of preparation has been found by us to be a comparatively simple two-step sequence. Therein, a suitable imide and propargyl chloride are first reacted in the presence of sodium amide and liquid ammonia to obtain the desired 1-propargyl-2-imide as starting material. The latter is then reacted with a selected aldehyde and a suitable di-substituted amine to obtain the desired compounds of the invention. As indicated in formula I, above, the two substituents on the amine reactant may be joined to form a heterocyclic ring.

The two-step described above is represented schematically in Equations 1 and 2 below:

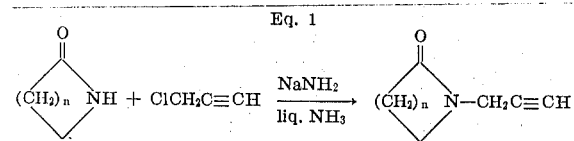

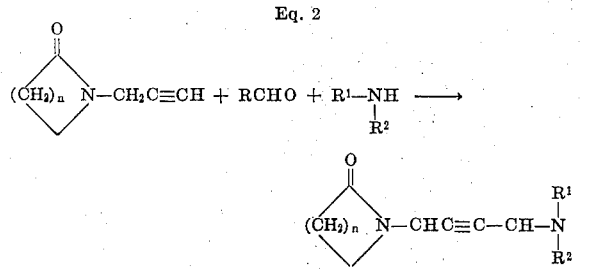

wherein $n$, R, $R^1$ and $R^2$ have the same meaning referred to hereinbefore.

Many of the reactants employed in the processes of this invention are known compounds which are readily available from commercial sources. Others which are not commercially available can readily be prepared in accordance with standard organic procedures which are known to those skilled in the art.

When the compounds of the invention are employed as central nervous system depressants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. It will generally be found that when the dosage is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.02 mg. to about 1.5 mg. per kg. of body weight per day, although as aforementioned variations will occur. However, a dosage level that is in the range of from about .2 mg. to about 0.5 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I 1-(4-Diethylamino-2-butynyl)-2-Pyrrolidinone

A mixture of diethylamine (7.7 g.), acetic acid (6.3 g.) and water (10 ml.) was cooled to room temperature. 12.3 g. of 1-propargyl-2-pyrrolidone was added, followed by 8.5 g. of 37 percent aqueous formaldehyde and 0.25 g. of cuprous chloride. The mixture was stirred for 2 days then extracted with chloroform. Evaporation of the dried extracts and distillation of the residue gave the product as a colorless liquid (13.65 g., 66 percent) b.p. 121°–122°/0.15 mm.

Analysis:
Calculated for $C_{12}H_{20}N_2O$: C, 69.19; H, 9.68; N, 13.45
Found: C, 68.90; H, 9.43; N, 13.43

EXAMPLE II

1(4-Piperidino-2-butynyl)-2-Pyrrolidinone

This compound was prepared by the method described in Example I, using piperidine in place of diethylamine. The fraction boiling at 126°–140°/0.1 mm. was collected (12.45 g.). On redistillation, the product boiled at 136°–138°/0.1 mm. Analysis: Calculated for $C_{13}H_{20}N_2O$: C, 70.87; H, 9.15; N, 12.72 Found: C, 70.92; H, 9.03; N, 12.50

EXAMPLE III 1-(4-Morpholino-2-butynyl)-2-Pyrrolidinone

1-Propargyl-2-pyrrolidinone was reacted with formaldehyde and morpholine under the conditions utilized in Examples I and II. The product (13.5 g.) was obtained by distilling through a Vigreaux Column. It boiled at 148°/0.15 mm.

Analysis:
Calculated for $C_{12}H_{18}N_2O_2$: C, 64.84; H, 8.16; N, 12.60
Found: C, 64.65; H, 7.87; N, 12.37

EXAMPLE IV 1-(Morpholino-Δ-2-pentynyl)-2-Pyrrolidinone

By the reaction of 1-propargyl-2-pyrrolidinone with acetaldehyde and morpholine under the conditions of Example I, the title compound is obtained.

EXAMPLE V 1-(4-[4-Methylpiperazino]-2-butynyl)-2-Pyrrolidinone

The compound 1-propargyl-2-pyrrolidinone is reacted with formaldehyde and 4-methylpiperazine in the manner described for Example I to give the title compound.

EXAMPLE VI – XII

Following the procedure described in Example I, the compounds listed in the Table below are reacted to give the respective compounds of the invention:

Table

| Ex. | Propargyl Amine Compound | Carbonyl Compound | Amine Compound | Product Compound |
| --- | --- | --- | --- | --- |
| VI | 1-Propargyl-2-oxopiperidine | Formaldehyde | Ethylbenzylamine | 1-(4-Ethylbenzylamino-2-butynyl)-2-oxopiperidine |
| VII | 1-Propargyl-2-pyrrolidinone | Formaldehyde | 2,5-Pyrrolidindione | 1-[4-(2,5-Pyrrolidindione-2-butynyl)]-2-pyrrolidinone |
| VIII | 1-Propargyl-2-pyrrolidinone | Formaldehyde | 2-Thio-pyrrolidone | 1-[4-(2-Thio-pyrrolidone-2-butynyl)]-2-pyrrolidinone |
| IX | 1-Propargyl-2-pyrrolidinone | Formaldehyde | Dibutylamine | 1-(4-Dibutylamino-2-butynyl)-2-pyrrolidinone |
| X | 1-Propargyl-2-pyrrolidinone | Formaldehyde | Dibenzylamine | 1-(4-Dibenzylamino-2-butynyl)-2-pyrrolidinone |
| XI | 1-Propargyl-2-oxopiperidine | Benzaldehyde | Dibutylamine | 1-(4-Dibutylamino-1-phenyl-2-butynyl)-2-oxopiperidine |
| XII | 1-Propargyl-2-pyrrolidinone | Butyraldehyde | Dimethylamine | 1-[(4-Dimethylamino)-Δ-2-heptynyl]-2-pyrrolidinone |

We claim:
1. A compound of the group having the formula:

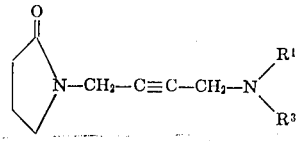

wherein $R^1$ and $R^2$, when separate, are each of the group consisting of lower alkyl consisting of from 1 to 4 carbon atoms and, when joined, complete a ring of the group consisting of piperidino and morpholino.
2. A compound as defined in claim 1, which is: 1-(4-diethylamino-2-butynyl)-2-pyrrolidinone.
3. A compound as defined in claim 1, which is: 1-(4-piperidino-2-butynyl)-2-pyrrolidinone.
4. A compound as defined in claim 1, which is: 1-(4-morpholino-2-butynyl)-2-pyrrolidinone.

* * * * *